US012650048B2

(12) United States Patent
Annycke et al.

(10) Patent No.: US 12,650,048 B2
(45) Date of Patent: Jun. 9, 2026

(54) ELECTROMECHANICAL ACTUATOR FOR DRIVING A CLOSURE OR SUN PROTECTION SCREEN, CLOSURE OR SUN PROTECTION SYSTEM COMPRISING SUCH AN ACTUATOR AND METHOD FOR DIMENSIONING A COMPENSATION SPRING FOR A RANGE OF BLINDS EACH INCORPORATING SUCH AN ACTUATOR

(71) Applicant: SOMFY ACTIVITES SA, Cluses (FR)

(72) Inventors: Xavier Annycke, Cluses (FR); Frédéric Negrello, Cluses (FR); Frédéric Maraval, Cluses (FR); Bruno Lambersend, Cluses (FR); Lionel Burdet, Cluses (FR); Eric Lagarde, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 304 days.

(21) Appl. No.: 17/788,205

(22) PCT Filed: Dec. 22, 2020

(86) PCT No.: PCT/EP2020/087684
§ 371 (c)(1),
(2) Date: Jun. 22, 2022

(87) PCT Pub. No.: WO2021/130258
PCT Pub. Date: Jul. 1, 2021

(65) Prior Publication Data
US 2023/0024400 A1 Jan. 26, 2023

(30) Foreign Application Priority Data
Dec. 23, 2019 (FR) ...................................... 1915441

(51) Int. Cl.
*E06B 9/72* (2006.01)
*E06B 9/42* (2006.01)
(Continued)

(52) U.S. Cl.
CPC .................. *E06B 9/72* (2013.01); *E06B 9/42* (2013.01); *E06B 9/60* (2013.01); *H02K 1/16* (2013.01); *H02K 7/14* (2013.01)

(58) Field of Classification Search
CPC ..... E06B 9/42; E06B 9/56; E06B 9/60; E06B 9/68; E06B 9/72; E06B 2009/725; H02K 1/16; H02K 7/14
See application file for complete search history.

(56) References Cited

U.S. PATENT DOCUMENTS 5,451,824 A * 9/1995 Sieber ...................... H02K 7/06
310/20
6,201,364 B1 * 3/2001 Will .......................... E06B 9/88
160/310
(Continued)

FOREIGN PATENT DOCUMENTS

EP 3 093 623 11/2016
WO 2006/107602 10/2006
WO 2019/043565 3/2019

OTHER PUBLICATIONS

International Search Report dated Mar. 19, 2021, for PCT/EP2020/087684, 5 pp., including English translation.
(Continued)

*Primary Examiner* — Abe Massad
*Assistant Examiner* — Matthew R. Shepherd
(74) *Attorney, Agent, or Firm* — NIXON & VANDERHYE

(57) ABSTRACT

An electromechanical actuator for driving a movable closure or sun protection screen includes a motor, a control board, a gear reduction assembly and a connector for connecting to a power supply source. The connector includes eight electrical contacts, the connector being in particular an RJ45 connector, for supplying power to the actuator and transmitting data from an Ethernet network. The motor is a synchronous motor including a wound stator and a rotor with permanent magnets, the stator winding being designed to withstand a voltage of 46V to 57V, in particular a voltage of 48V.

24 Claims, 5 Drawing Sheets

(51) Int. Cl.
    *E06B 9/60*        (2006.01)
    *H02K 1/16*       (2006.01)
    *H02K 7/14*       (2006.01)

(56)        References Cited

U.S. PATENT DOCUMENTS

| | | | | |
|---|---|---|---|---|
| 7,599,612 | B2 * | 10/2009 | Moseley | E06B 9/68 |
| | | | | 160/310 |
| 7,723,939 | B2 * | 5/2010 | Carmen, Jr. | E06B 9/40 |
| | | | | 318/16 |
| 2004/0119363 | A1 * | 6/2004 | Tanaka | H02K 21/16 |
| | | | | 310/214 |
| 2005/0053087 | A1 * | 3/2005 | Pulyk | H01R 31/065 |
| | | | | 370/463 |
| 2005/0263254 | A1 * | 12/2005 | Sievers | B64C 1/1484 |
| | | | | 160/90 |
| 2013/0099714 | A1 | 4/2013 | Mullet et al. | |
| 2019/0100961 | A1 | 4/2019 | Kutell et al. | |

OTHER PUBLICATIONS

Written Opinion of the ISA dated Mar. 19, 2021, for PCT/EP2020/087684, 8 pp.
French Search Report dated Sep. 11, 2020, for FR 1915441, 2 pp.

* cited by examiner

ELECTROMECHANICAL ACTUATOR FOR DRIVING A CLOSURE OR SUN PROTECTION SCREEN, CLOSURE OR SUN PROTECTION SYSTEM COMPRISING SUCH AN ACTUATOR AND METHOD FOR DIMENSIONING A COMPENSATION SPRING FOR A RANGE OF BLINDS EACH INCORPORATING SUCH AN ACTUATOR

This application is the U.S. national phase of International Application No. PCT/EP2020/087684 filed Dec. 22, 2020, which designated the U.S. and claims priority to FR 1915441 filed Dec. 23, 2019, the entire contents of each of which are hereby incorporated by reference.

BACKGROUND OF THE INVENTION

Field of the Invention

The present invention relates to an electromechanical actuator for driving a movable closure or sun protection screen. The present invention also relates to a closure or sun protection system comprising such an actuator, as well as to a method of dimensioning a compensation spring for a range of blinds each incorporating such an actuator.

Description of the Related Art

Such actuators for closure or sun protection systems, in particular for driving indoor blinds, are generally tubular in shape for insertion into a winding tube on which the closure or sun protection screen is wound. They can be powered by stand-alone power sources, such as rechargeable batteries or cells. The actuator must be designed to allow for long term operation taking into account potential difficulties in energy replenishment.

Roller blind systems with a pre-tensioned compensation spring are known in the prior art. Such systems use the compensation spring to enable the forces for raising the blind to be limited, by increasing the preload of the spring during a deployment motion of the blind. Such springs are used in manual systems, but also in systems motorised by an electromechanical actuator, in particular to limit the electrical energy required to move the blind through a raising-lowering cycle. They are therefore well-suited for actuators with an autonomous power source. The compensation spring may be located in a winding tube on which the blind is wound, opposite the electromechanical actuator, or on the body of the electromechanical actuator, or at the output shaft of the electromechanical actuator. The preload must take into account, among other things, the number of revolutions that the winding tube must make between a high and a low point of the blind, i.e. between a fully rolled-up position of the blind and a fully unrolled position. At the same time, it is possible to choose a compensation spring rate to be used for a blind, especially taking into account the mechanical power to be provided to the blind to move it.

However, setting a compensation spring rate for each blind increases the cost of systems with such blinds.

Another source of power available, especially in commercial buildings or new residential construction, is power via an Ethernet network. PoE (Power over Ethernet) technology allows an Ethernet network to be used both for supplying power to electrical loads in the building and for transmitting data, such as control signals from electrical loads.

PoE technology is based on the standard for computer networks published by the IEEE (Institute of Electrical and Electronics Engineers) under the reference 802.3:

The IEEE 802.3af (PoE) standard provides a maximum power of 15 W for an input voltage of 46 to 57 VDC.

The IEEE 802.3at (PoE+) standard provides a maximum power of 30 W for an input voltage of 52 to 57 VDC.

The IEEE 802.3bt (High Power PoE) standard provides a maximum power of 100 W for an input voltage of 52 to 57 VDC.

Ethernet cables suitable for power and data transmission consist of four pairs of wires. Data is transmitted on at least two pairs of wires, namely wires numbered 1, 2, 3 and 6, while power is transmitted on at least two other pairs of wires, namely wires numbered 4, 5, 7, and 8.

In the field of actuators for closure or sun protection systems, motors powered by a supply source such as batteries are usually brush and commutator DC motors, designed to operate at 12V or 24V.

In the case of PoE technology, the nominal voltage is around 48V. Direct current motors powered directly at 48V are difficult to obtain, due to the high temperature rise in the brushes and commutators at these voltage levels. This is because the tension is high for the number of brushes and collectors, especially in small spaces such as a winding tube for a closure or sun protection screen with a diameter of 60 mm, 50 mm or less.

Therefore, as the motor is designed to support a lower voltage than that provided by the Ethernet connection, it is necessary in a PoE-powered actuator to use a converter to avoid damage to the motor. However, the use of a converter entails additional cost and complexity, as well as a large footprint that can be problematic when a compact solution is required. On the other hand, the use of a converter penalises the electrical efficiency of the actuator.

SUMMARY OF THE INVENTION

These disadvantages are specifically addressed by the invention, which proposes a more compact electromechanical actuator for driving a closure or sun protection screen, with an optimised electrical efficiency compared to an actuator with a converter.

To this end, the invention relates to an electromechanical actuator for driving a movable closure or sun protection screen, the actuator comprising a motor, a control board, a brake, a gear reduction assembly and a connector for connection to a power supply source. According to the invention, the connector comprises eight electrical contacts, the connector being in particular of the RJ45 type, for powering the actuator and transmitting data from an Ethernet network, the motor is a synchronous motor comprising a wound stator and a rotor with permanent magnets, the motor being adapted to operate directly at the voltage provided by the Ethernet network, the stator winding being designed to withstand a voltage of 36V to 57V, preferably a voltage of between 46V and 57V, in particular a voltage of about 48V.

With the invention, the presence of a brushless permanent magnet synchronous motor, designed to operate at a voltage of, for example, about 48V, does not require the addition of a converter. This is because the motor is designed to withstand the voltage of the current supplied through the Ethernet connection. This also means that the smaller the diameter of the actuator, the more space it takes up. On the other hand, the wires used for the stator winding of a permanent magnet synchronous motor are smaller in diameter than a motor of the same type, providing the same torque and designed to operate at 12V or 24V. This allows for a higher fill factor and therefore a higher electrical efficiency of the motor. However, as the electrical power that can be supplied through PoE cables is limited, it is important to optimise the electrical efficiency of the electromechanical actuator.

According to advantageous but not mandatory aspects of the invention, such an actuator may incorporate one or more of the following features, taken in any combination that is technically feasible:

The maximum diameter of the actuator is less than 60 mm, in particular less than 50 mm.

The actuator comprises a compensation spring.

The compensation spring is preloaded, a number of pre-load turns being adapted to a compensation spring rate and determined to minimise a maximum electrical power to be supplied by the motor.

According to another aspect, the invention relates to a closure or sun protection system comprising a blind equipped with a screen and an actuator as mentioned above.

In yet another aspect, the invention relates to a method of dimensioning a compensation spring for a range of blinds of different widths and heights, each blind incorporating an actuator as described above. According to the invention, this method comprises at least the following steps: Firstly, in a step a) the range of blinds to be equipped with compensation springs is chosen. Next, in a step b), a range of compensation spring rates to be tested is selected. Then, in a step c), for each spring rate in the range of m rates, the behaviour of the n blinds is determined. In a step d), a single spring rate suitable for the entire range of blinds is selected from the range of m rates according to the behaviour of the n blinds determined in step c).

This method has the same advantages as mentioned above for the Ethernet-powered actuator.

According to advantageous but not mandatory aspects of the invention, such a method includes one or more of the following features, taken in any combination that is technically feasible:

step c) comprises sub-steps: A first sub-step e) consists of calculating, for a spring rate, a maximum power to be supplied by the motor over a rise and fall cycle of the blind and storing this value in a memory for each blind of the range of blinds considered. A second sub-step f) consists of selecting, for each spring rate, the largest maximum electrical power to be supplied from among the maximum electrical powers calculated in sub-step e) and storing this value, together with the associated spring rate, in the memory.

the spring rate selected in step d) is the spring rate associated with the lowest power, selected from the rates in step f).

the maximum electrical power delivered for each blind depends on the maximum torque to be delivered in the fully unwound position of the blind and the electrical efficiency of the motor.

BRIEF DESCRIPTION OF THE DRAWINGS

The invention will be better understood and advantages beyond these will emerge more clearly in light of the following description of an embodiment of an electrome-chanical actuator for driving a closure or sun protection screen, closure or sun protection system, and method for dimensioning a compensation spring according to that prin-ciple, given solely by way of example and made with reference to the accompanying drawings, in which.

DESCRIPTION OF THE PREFERRED EMBODIMENTS

Figure 1:
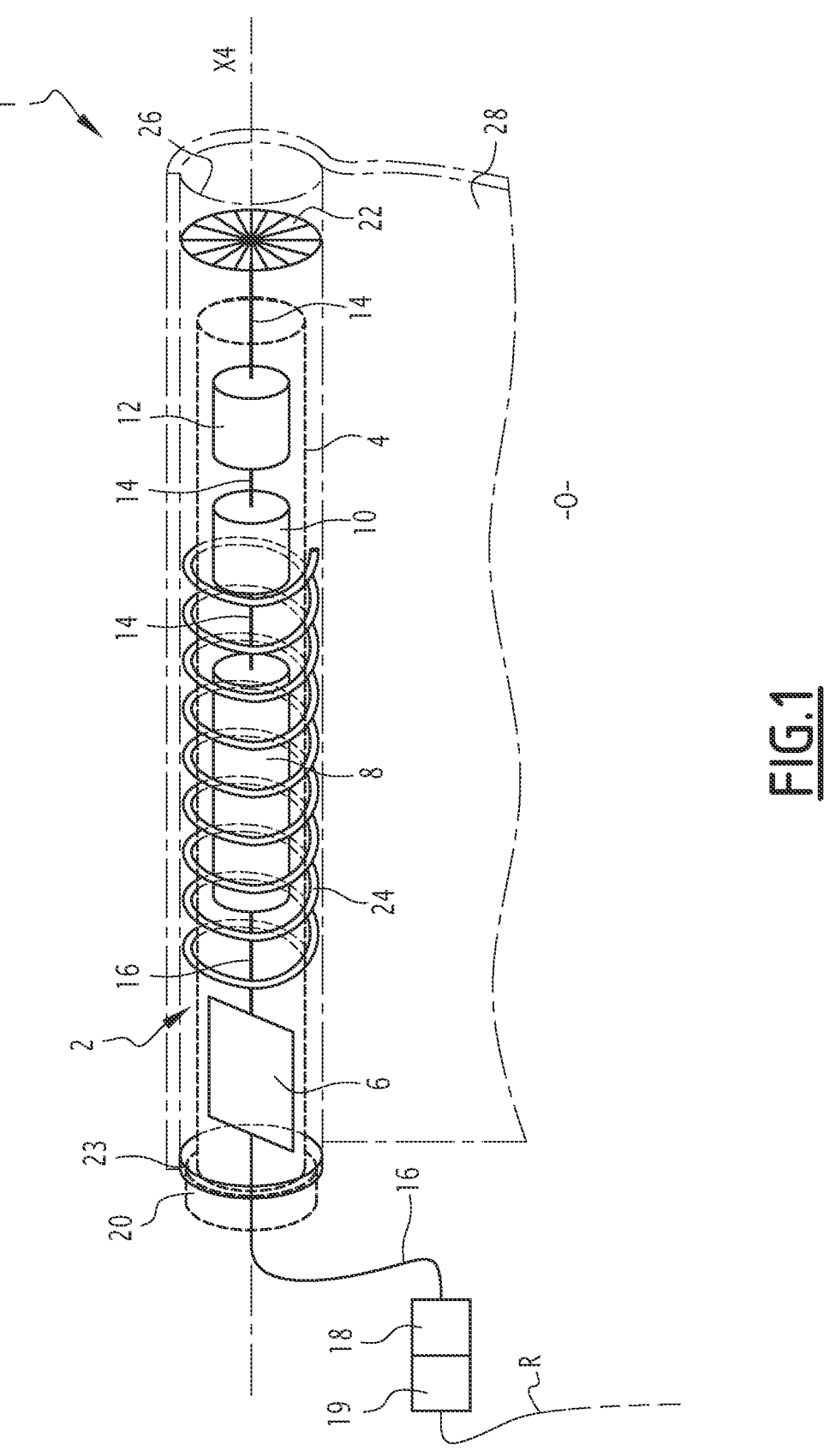
FIG. 1 is a diagram of a system according to the invention incorporating an actuator.

A sun protection system I, which comprises an electro-mechanical actuator 2 to be powered by an Ethernet network R, is schematically depicted in FIG. 1.

The system I further comprises a motorised blind as home automation equipment. The motorised blind particularly comprises a screen 28 and a winding shaft 26, on which the screen 28 is wound.

The electromechanical actuator 2 is arranged at least partially in the winding shaft 26, which has the shape of a winding tube. It provides a rotary drive to the winding tube 26 via a linkage 14, such as an output shaft. The actuator 2 comprises a housing 4, shown in dotted line in FIG. 1, defining an axis X4.

The housing 4 contains a control board 6, a motor 8, a brake 10 and a gear reduction assembly 12 which belong to the actuator 2 and are aligned, in that order, along the axis X4 and are connected to each other by linkages 14 and 16.

The linkages 14 are mechanical connections between the motor 8 and the brake 10 and between the brake 10 and the gear reduction assembly 12. The linkage 16 is an electronic link between the control board 6 and the motor 8.

The motor 8 is a brushless, electronically commutated DC motor, commonly known as a BLDC (BrushLess Direct Current) motor, or more generally as a PMSM (Permanent Magnet Synchronous Motor).

The electric motor 8 of the electromechanical actuator 2 is now described in more detail with reference to FIGS. 2 and 5. The motor 8 comprises a rotor with permanent magnets 82 and a stator 84 comprising a winding 87 formed by windings 86 electrically supplied by supply lines 65 connected to a supply circuit 62. For example, the rotor 82 is connected indirectly to the winding shaft 26.

D3 is the outside diameter of the electric motor 8, which in practice equal to the outside diameter of the stator 84.

The rotor 82 comprises a rotor body 81, provided with magnetic elements 83 surrounded by the stator 84. The magnetic elements 83 are arranged on the outer circumfer-ence of the rotor body 81. The magnetic elements 83 of the rotor 82 are permanent ferrite magnets.

The magnetic elements 83 are separated from the stator 84 by an air gap 80, radial to the axis of rotation X.

The radial thickness of the magnetic elements 83, which is measured in a direction radial to the X axis, is denoted as e88. This thickness e88 is chosen to be greater than 3 mm, preferably between 3.8 and 4.2 mm, which contributes to providing the electromagnetic forces necessary for the operation of the motor, contributes to the industrial feasi-bility of the permanent magnets and limits the risks of demagnetisation thereof. The magnetic elements or perma-nent magnets 83 can be attached to the outer circumference of the rotor body 81 by gluing, overmoulding or any other known technique.

D5 is the outer diameter of the rotor 82 and D6 is the outer diameter of the rotor body 81. The diameter D5 is greater than or equal to half the diameter D3.

The stator 84 is formed by a stator core 85 of magnetisable material, more specifically ferromagnetic material, which is generally formed by a stack, or pack, of laminations and provided with insulating linings. The stator core 85 comprises pole elements 88 distributed over a peripheral wall 89 of the stator core 85, preferably on the inside of the peripheral wall 89 of the stator core 85. The stator 84 is obtained from a stator core 85 comprising a stack of laminations each forming a closed circumference, to which the coil 87 is attached, and not by a set of wound sectors with one or more teeth which, by their assembly, form the closed circumference of the stator core 85. The small dimensions of the electric motor 8 do not allow the stator 84 to be produced by assembling several wound angular sectors.

Figure 5:
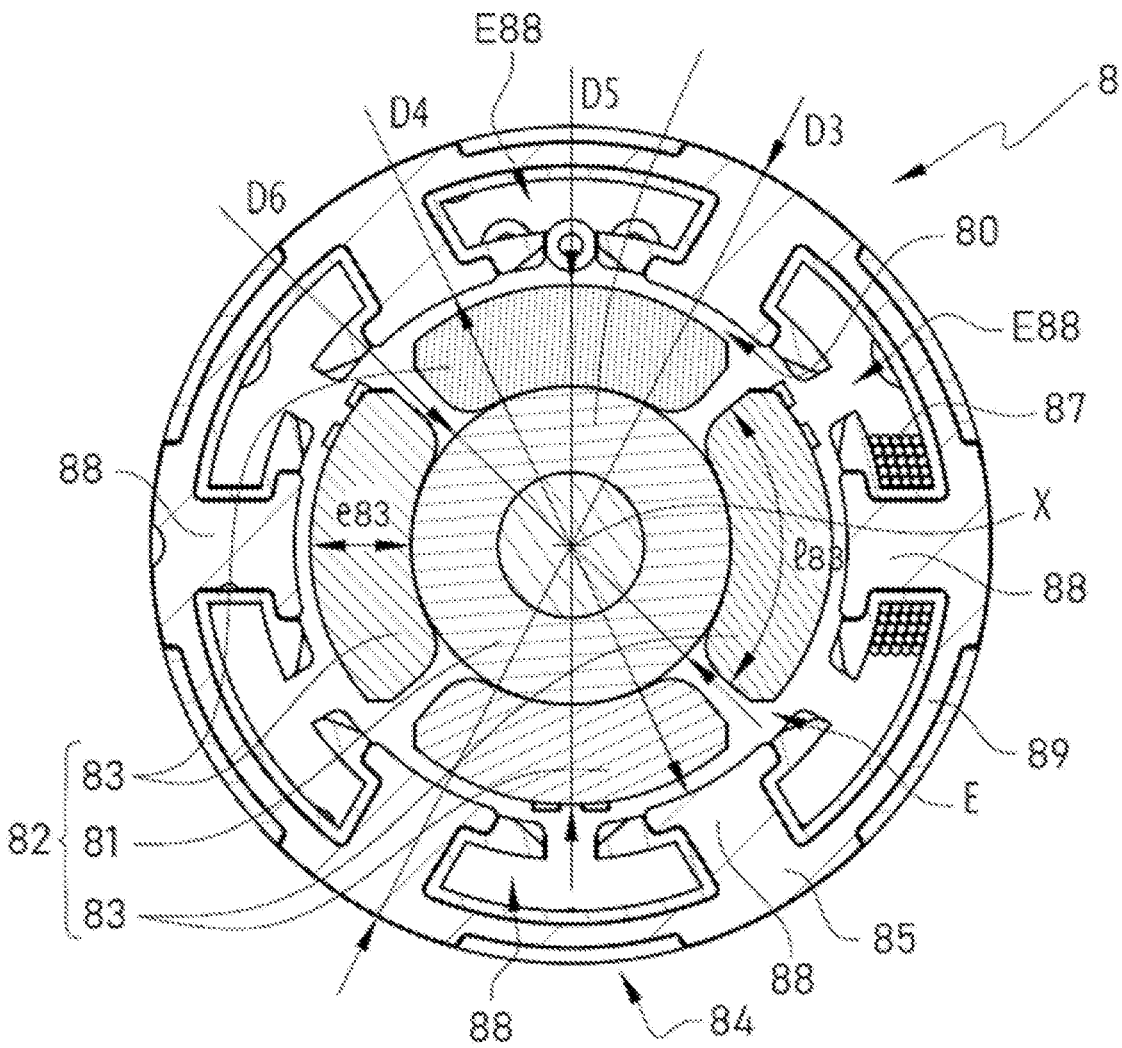
FIG. 5 is a cross-section of the electric motor of the actuator according to one embodiment.

In FIG. 5, a single coil 87 is shown in place around a single pole piece 88, for clarity.

The pole elements 88 of the core 85 project inwards from the peripheral wall 89 of the electric motor 8. Advantageously, there are six of them, uniformly distributed over the peripheral wall 89, thus forming a six-pole stator 84, The space E88 formed between two adjacent polar elements 88 is called a notch. Coils 87 are positioned in the slots around the pole pieces 88 of the stator 84. More specifically, each pole element 88 is surrounded by its own coil 87. These coils 87 are such that they have the same number of turns per pole element. The coils 87 of the diametrically opposed pole elements are connected at the ends of the stator core 84 to form a phase.

The coil of motor 8 is designed to operate at 48 volts (V). In other words, the coil formed by windings 86 of the stator 84 is adapted to withstand a voltage of 48V.

The coil 87 is made of copper wire adapted to operate at 48 volts. In other words, the diameter of the copper wire used to form the coil 87 of the stator 84 is adapted to operate directly at the voltage supplied by the Ethernet network.

The wire diameter used is smaller than for a motor suitable for 12V or 24V operation, which allows the stator slots 84 to be better filled and thus optimises the electrical efficiency of the motor 8.

The actuator 2 further comprises a connector 18, with eight positions and eight electrical contacts, of the RJ45 (short for "Registered Jack") type. This connector 18 is commonly referred to as the male RJ45 socket. The connector 18 is connected to the control board 6 via an electronic link 16. The connector 18 may be attached, as shown in FIG. 1, to the end of a cable exiting the actuator 2. It is intended to be connected to a complementary connector 19, commonly called "RJ45 female socket" adapted to supply to the motor 8, from the Ethernet network R which also belongs to the system I, a current with a voltage of about 48V for which the motor 8 is particularly suited. There is therefore no need to add a converter between the connector 18 and the motor 8. This results in a compact, economical and reliable actuator 2 with optimum electrical efficiency.

In addition, a torque support 20, commonly referred to as the "actuator head", is provided at one end of the housing 4, for attaching the actuator 2, for example, to a bulkhead not shown. According to a variant of the invention not shown, the connector 18 may also be integrated at the torque support 20 of the actuator 2.

The actuator 2 further comprises an impeller 22, which is rotatable relative to the torque support 20 and the housing 4 of the actuator 2 and is rotatably fixed in the winding shaft 26 and on the output shaft 14. The impeller 22 allows the winding shaft 26 to be rotated by the output shaft 14 of the actuator 2, for raising or lowering the screen 28 of the blind. The actuator 2 comprises an ring gear 23, which is rotatably free relative to the torque support 20 and the housing 4 of the actuator 2 and is rotatably fixed in the winding shaft 26. The ring gear 23 forms a bearing for rotational support of one end of the winding shaft 26 on the housing 4 of the actuator 2. For ease of reading the drawings, the winding tube 26 and the screen 28 are shown as mixed lines in FIG. 1. The screen 28 can be used to selectively block out all or part of an opening O, such as a window. The blind consists of elements 26 and 28.

In the example of the figures, the screen 28 is a fabric. Alternatively, it may be a slat assembly.

In operation, the instantaneous power that the Ethernet network can provide is limited, especially by the 802.3af (PoE) and 802.3at (PoE+) standards that are most commonly used.

Figure 3:
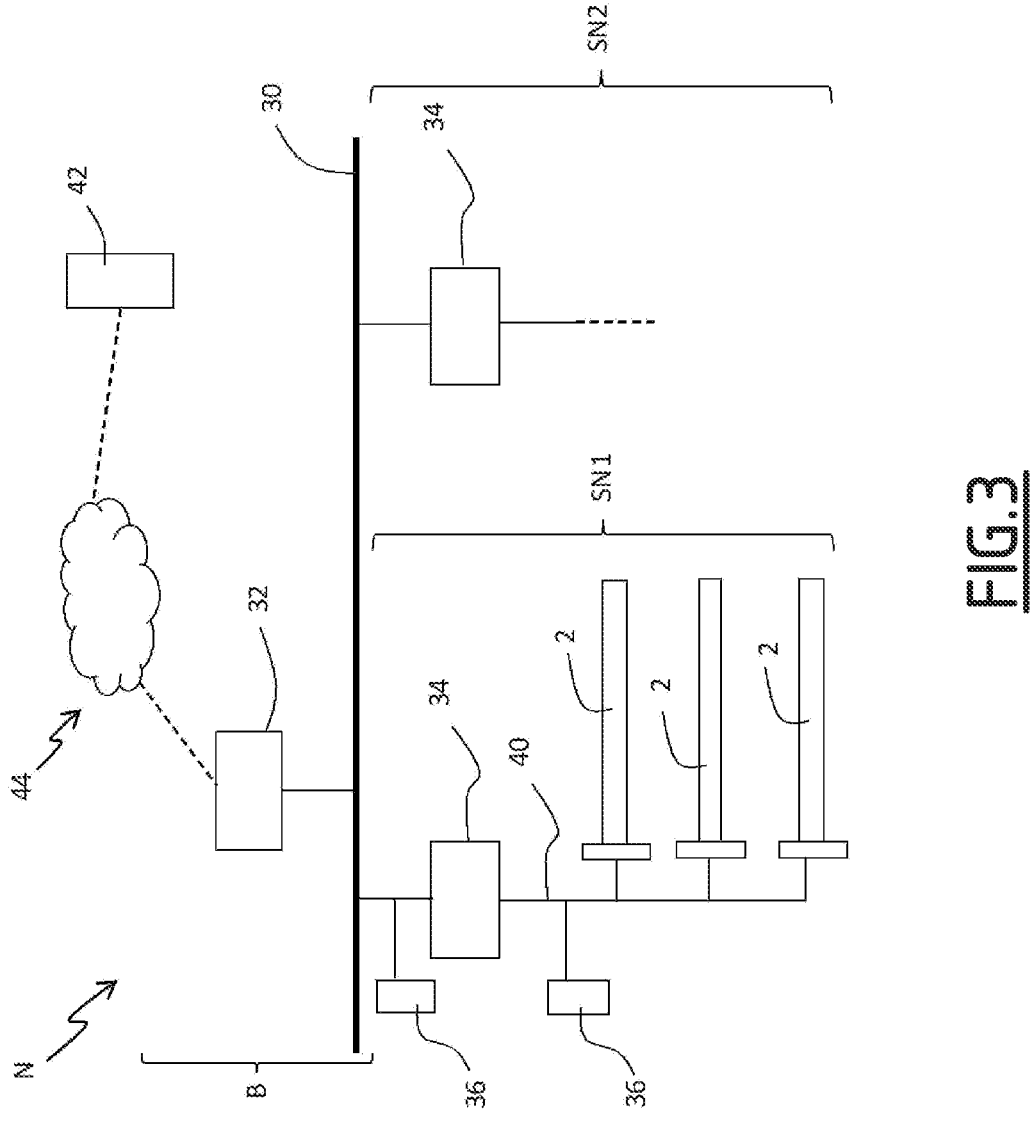
FIG. 3 is a diagram of a home automation network comprising an actuator according to the invention.

FIG. 3 shows a communication network N, such as a hierarchical network with several hierarchy levels or ranks. The communication network N comprises a core network B, which includes a common data bus 30, forming a physical backbone, to which a control unit 32 is connected. For example, the link 30 is a wired Ethernet link, for example an Ethernet link with a data rate of 100 Mbit/s or higher.

The network N also includes at least a first subnet, identified by the reference SN1, and a second subnet denoted SN2. These subnets each have a network device 34, which is connected to the backbone 30 and forms a head of that subnet SN1 or SN2. This may be a router, where the core network B and the subnet SN1 or SN2 are of the same nature, or a switch. Routers or switches are two intermediate network devices in the N communication network that route data packets and distribute electrical power. In the example shown in FIG. 2, two switches 34 are connected to the backbone 30, forming two separate subnets SN1 and SN2. Only the subnet SN1 is described in the following.

The subnet SN1 contains at least one piece of home automation equipment of the home automation system, such as one or more electromechanical actuators 2, connected to the corresponding network equipment 34 via a physical link 40, preferably wired, such as a four-wire pair Ethernet cable. Through the communication network N, each piece of home automation equipment in the network can thus be controlled by a remote mobile terminal 42, connected to the communication network N for example through an Internet link 44, and whose commands are transmitted through the physical backbone 30 and through the routers and/or switches 34 to the home automation equipment. The home automation equipment is also powered by the external power supplied by the Ethernet cable.

Control units 36, such as switches, or remote controls, or sensors or mobile communication terminals, or computers such as a home automation control unit, are also part of the communication network N. They allow the electrical equipment to be controlled, for example by transmitting position instructions and/or movement orders to the actuators 2. The control units 36 may also be supplied with electrical power via the wired network of the physical link 40.

Figure 2:
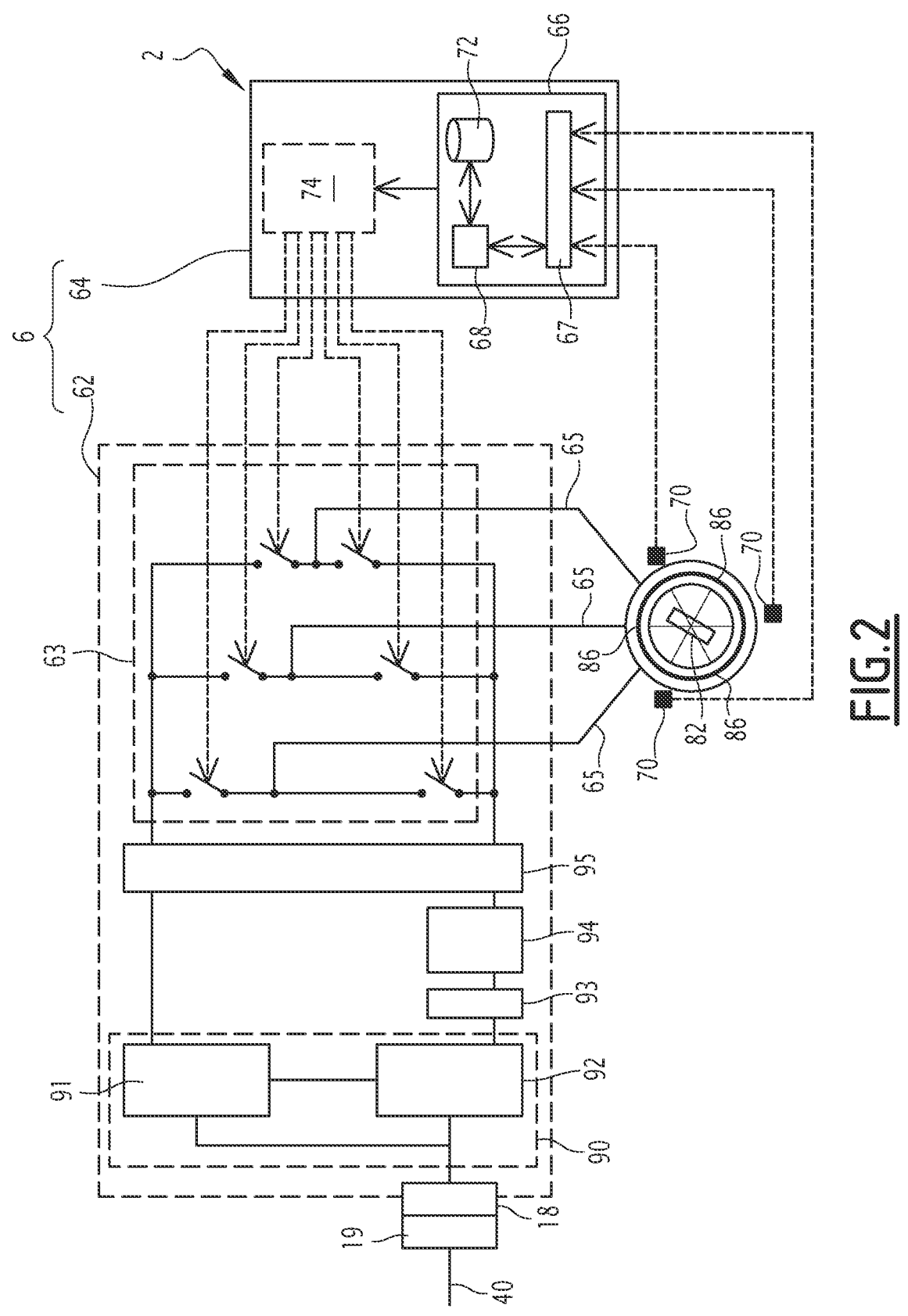
FIG. 2 is a simplified electronic diagram of an actuator according to the invention.

As shown in FIG. 2, the control board 6 of the electromechanical actuator 2 comprises a power supply circuit 62 and an electronic control unit 64, described in more detail in the following.

Optionally, the motor 8 may comprise one or more position sensors 70, configured to measure the angular position of the rotor 82. For example, the sensor(s) 70 are Hall effect magnetic sensors, cooperating with a code wheel rotationally fixed with the rotor 82 of the motor 8 or cooperating directly with the permanent magnets of the rotor 82, these examples not being limiting.

The power supply circuit 62 is powered by the communication network N, including the subnet SN1, through the electrical connector 18 and the complementary connector 19. The power supply to the circuit 62 is carried out with a DC voltage of the order of 48V.

The power supply circuit 62 comprises a data and power splitter circuit 90 to which power and data are supplied. The splitter circuit 90 is adapted to split the data and power transmitted through the different wires of the Ethernet cable of the physical link 40. The data and power splitter circuit 90 mainly comprises a magnetic circuit 91 and a rectifier 92 for rectifying the divided power supply. In particular, the rectifier 92 comprises diodes or a diode bridge or diodes ideal for limiting power losses in the rectifier 92. A voltage measurement unit 93 is adapted to measure the voltage at the rear of the data and power splitter circuit 90. The voltage measurement unit 93 includes a so-called signature resistance. The electromechanical actuator 2 connected to the network N is defined as network-compatible if the signature associated with the signature resistance, which is of the order of 25 kΩ for an 802.3af standard PoE network, is as expected. The signature is obtained by applying a low voltage, for example between 2.7 and 10V, as a common mode voltage to the input of the actuator 2. The voltage measurement unit 93 is used to validate the presence of the signature resistance.

The power supply circuit 62 further comprises a classification negotiation circuit 94. This circuit 94 comprises a classification resistance. By applying a first classification voltage, the amount of current that is used by the supply circuit 62, determined by the value of the classification resistance, makes it possible to determine how much electrical energy the actuator 2 needs and to provide this indication to the network N. Alternatively, this classification is semi-automatic or automatic when the actuator is connected to the network N.

The actuator further comprises a controller circuit 95 whose function is to identify the actuator 2 in the SN1 subnet and to negotiate the power class with the N network.

The controller 95 also receives commands from the network N, which are transmitted through the connectors 18 and 19, via the splitter circuit 90. The controller circuit 95 is also adapted to interface with the control unit 64 to operate power switches 63, such as transistors. The controller circuit 95 further comprises a voltage converter, not shown, which operates to reduce the input voltage to below 10V, for example 6V, for powering the electronic components of the controller circuit 95. The voltage converter does not affect the power voltage supplied to the motor 8, as the motor 8 is adapted to operate directly from the voltage supplied by the network N.

In particular, the control unit 64 is configured to drive the motor 8 to move the screen 28 to a desired position.

For example, the control unit 64 is configured to drive the motor 8 using a pulse width modulation (PWM) technique.

In some examples, the control unit is further configured to drive the motor 8 taking into account the angular position of the rotor 82 measured by the sensor(s) 70.

The control unit 64 here comprises an electronic control circuit 66 with an input interface 67, for example for collecting measurement signals from the sensor(s) 70, a processor 68, and a memory 72.

For example, the processor 68 is a programmable microcontroller or microprocessor.

The memory 72 comprises executable instructions and/or software code to implement a method for operating the actuator 2 when these instructions are executed by the calculating logic unit.

The control unit 64 may comprise a signal output interface 74, for example for outputting control signals to drive the power switches of the control circuit 62 in accordance with commands from the processor 68.

The control unit 64 may comprise a command-receiving input, not shown, for receiving positional instructions and/or movement commands, for example opening or closing the screen 28, from a switch, or from a remote control, or from a mobile communication device, or from a computer such as a home automation control unit, for example associated with the connector 18. Commands can also be received via a radio receiver of the control unit, not shown. In this case, the Ethernet link of the physical link 40 may only be used for powering the actuator 2 and not always for data transfer.

In order to limit the instantaneous power required by the motor 8 to unwind or rewind the blind over its entire stroke between its end positions, the actuator 2 includes a compensation spring 24 wound around the housing 4. The compensation spring 24 is partially depicted in FIG. 1. The compensation spring 24 is stretched when the blind unwinds, i.e. when the screen 28 moves down, and tends to return to an unloaded configuration when the blind winds up, i.e. when the screen 28 moves up. Thus, the compensation spring 24 allows a maximum power Pmax supplied by the motor 8 to be reduced during a rise cycle of the screen 28.

To optimise the action of the compensation spring 24, it must be preloaded to minimise the maximum power Pmax supplied by the motor 8 during a raising/lowering cycle of the screen 28. The preload of the compensation spring 24 is expressed in revolutions of the compression spring 24 around the housing 4. This preload is adapted to a spring rate $k_{fin}$ of the compensation spring 24.

For a range of blinds of different widths and heights, the rates and preloads of the compensation spring 24 of each system I can be different. In order to size a single spring 24 suitable for the whole range of blinds, i.e. for the different possible systems, the method described in FIG. 2 is implemented. This means that there is no need to choose a spring rate for each system I, which reduces the manufacturing costs of the systems I and makes them easier to install.

Figure 4:
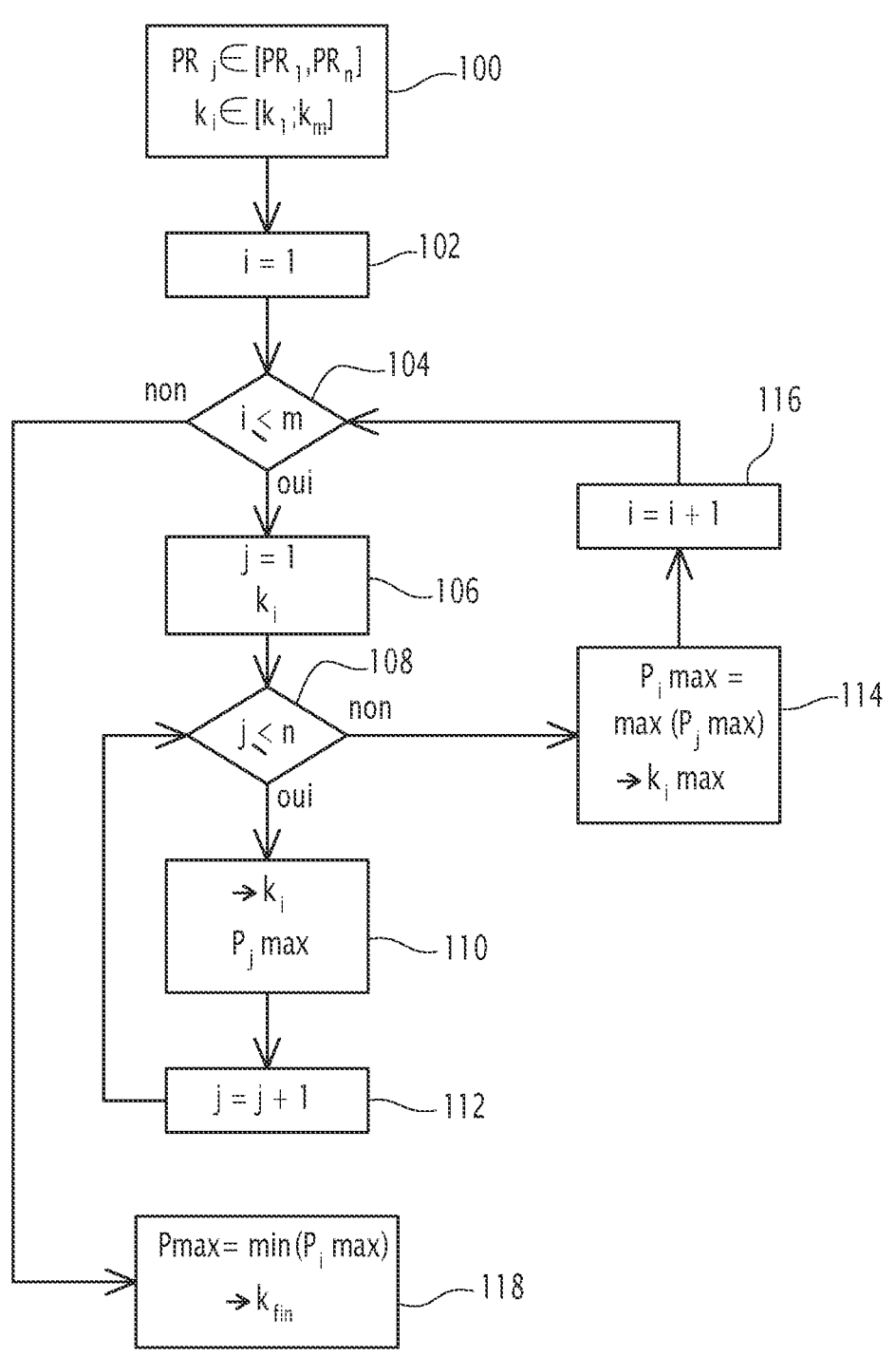
FIG. 4 is a schematic of a method for dimensioning a compensation spring according to the invention.

In a first step 100 of this method, a range of m rates of compensation springs 24 is defined, m being a natural number greater than or equal to 2. In FIG. 4, these spring rates are referenced $k_1$ to $k_m$. In this first step 100, the product line is also defined. It comprises n products, n also being a natural number greater than or equal to 2, i.e. n blinds of known heights and widths, referenced $PR_1$ to $PR_n$.

In an initialization step 102, a spring rate index i is initialized to 1.

Then, in a step 104, the spring rate index i is compared to the number m of rates in the spring rate range. If the spring rate index i is less than or equal to the number m of compensation spring rates 24, then a step 106 is implemented.

In step 106, a product index j is set to 1 and a spring rate $k_i$, associated with a preload, is selected, and then, in step 108, the product index j is compared to the number n of products considered. If the product index j is less than or equal to the number n of products considered, then, in a step 110, to determine the behaviour of the blind, a maximum electrical power $P_j$max to be supplied by the motor 8 over a cycle of raising and lowering of the blind is defined for the selected preload of the spring $k_i$. The electrical power $P_j$max depends on the maximum torque to be supplied in the unrolled position of the blind and the electrical efficiency of the motor 8. This power $P_j$max is stored in a memory, while being associated with the spring rate $k_i$. Then, in a step 112, the product index j is incremented by 1 and step 108 is performed again.

If, in step 108, the product index j is strictly greater than the number n of products, then a step 114 is implemented. In this step 114, a maximum electrical power $P_i$max is selected from all the maximum electrical powers $P_j$max previously calculated in the different steps 110 and stored in memory. For this purpose, the highest power $P_j$max is selected and its value is stored in memory as the maximum electrical power value $P_i$max, together with its spring rate, denoted $k_i$max. Then, in a step 116, the spring rate counter i is incremented by one, and step 104 is performed again.

If, in step 104, the spring rate counter i is strictly greater than the number m of spring rates, a final step 118 is implemented. In this step 118, the final spring rate $k_{fin}$ is selected by choosing, among the $k_i$max rates determined in steps 114, the spring rate associated with the lowest electrical power $P_i$max.

The spring rate $k_{fin}$ is considered to represent a satisfactory compromise for the rate constant of the spring 24 of the different actuators 2 and corresponds to the compensation spring 24 chosen for the whole product range $PR_j$, with j between 1 and n. This spring rate $k_{fin}$ makes it possible to minimise the power to be supplied by the motor 6 for all models of the product range $PR_j$.

Subsequently, the electrical power to be supplied for each blind can be minimised by adjusting the spring preload, the spring rate of which will have been optimally defined for a range of blinds.

Thus, the motor 2 consumes relatively little electrical energy when operating the blind, i.e. when unwinding or winding the screen 28 onto the winding shaft 26, which makes it compatible with a power supply from the Ethernet network R of the system I.

The invention is described above in the context of a sun protection system. It can also be used in the context of a closing system, where the screen 28 ensures a function of closing the opening O. In this case, the screen 28 of the blind may be a grid or an assembly of slats articulated together.

The invention is described above in the case where the stator winding 84 of the motor 8 is designed to operate at 48V. Alternatively, this winding can be designed to operate at a voltage of between 36V and 57V, preferably a voltage of between 46V and 57V.

Alternatively, the controller circuit 95 and the control unit 64 may be combined to form a single unit.

In another embodiment, the circuit 95 and the control unit 64 may comprise common parts.

The above-mentioned embodiment and variants can be combined to generate new embodiments.

The invention claimed is:

1. An electromechanical actuator for driving a mobile closure or sun protection screen, the electromechanical actuator comprising:

a control board;

a gear reduction assembly;

a connector configured to link to a power supply source, the connector comprising eight electrical contacts configured to power the electromechanical actuator and to transmit data from an Ethernet network to the control board; and a synchronous motor comprising a wound stator and a rotor with permanent magnets, the synchronous motor receiving a power voltage of 36V to 57V supplied through said connector through a wired Ethernet link from the Ethernet network without conversion of said power voltage, a winding of the stator being configured to operate at the power voltage of between 36V and 57V, wherein the control board comprises:

a control unit configured to drive the synchronous motor, and a power supply circuit comprising a controller circuit configured to receive commands transmitted from the Ethernet network through the connector and configured to interface with the control unit, the controller circuit comprising a voltage converter configured to reduce an input voltage provided by the Ethernet network to the controller circuit to below 10V to power electronic components of the controller circuit without affecting the power voltage supplied to the synchronous motor.

2. The actuator according to claim 1, wherein a maximum diameter of the actuator is less than 60 mm.

3. The actuator according to claim 1, further comprising a compensation spring.

4. The actuator according to claim 3, wherein the spring is preloaded, a number of preload turns being adapted to a spring rate of the compensation spring and determined to minimize a maximum electrical power to be supplied by the motor.

5. A closure or sun protection system comprising:

a blind equipped with a screen and the actuator of claim 1, wherein the actuator is configured to drive a winding shaft of the screen.

6. A method of dimensioning a compensation spring for a range of blinds of different widths and heights, each blind incorporating the actuator according to claim 3, the method comprising:

selecting a range of n blinds to be equipped with compensation springs;

selecting a range of m spring rates of compensation springs;

determining a behavior of the n blinds for each spring rate in the range of m spring rates;

selecting a single spring rate from the range of m spring rates, depending on the determined behavior of the n blinds, which is suitable for the entire range of blinds.

7. The method according to claim 6, wherein the selecting the range of m rates comprises the following successive operations:

i) for a spring rate, calculating a maximum power to be supplied by the motor over one up and down cycle of the blind and storage of this value in a memory for each blind of the range of blinds considered, and ii) for each spring rate, selecting the maximum power to be supplied which is the greatest among the calculated maximum electrical powers and storing this value, together with the associated spring rate, in the memory.

8. The method according to claim 7, wherein the selected single spring rate selected in operation i) is the spring rate associated with a lowest power, selected from the spring rates of operation ii).

9. The method according to claim 6, wherein a maximum electrical power delivered for each blind depends on a maximum torque to be provided in a fully unwound position of the blind and an electrical efficiency of the motor.

10. The actuator according to claim 1, wherein the winding of the stator is designed to withstand a voltage of between 46V and 57V.

11. The actuator according to claim 1, wherein the winding of the stator is designed to withstand a voltage of 48V.

12. The electromechanical actuator of claim 1, wherein the stator is designed to withstand a voltage of between 46V and 57V.

13. The electromechanical actuator of claim 1, wherein the stator is designed to withstand a voltage of 48V.

14. The actuator of claim 1, wherein a maximum diameter of the actuator is less than 50 mm.

15. The actuator according to claim 2, further comprising a compensation spring.

16. A closure or sun protection system comprising:

a blind equipped with a screen and the actuator of claim 2, wherein the actuator is configured to drive a winding shaft of the screen.

17. A closure or sun protection system comprising:

a blind equipped with a screen and the actuator of claim 3, wherein the actuator is configured to drive a winding shaft of the screen.

18. A closure or sun protection system comprising:

a blind equipped with a screen and the actuator of claim 4, wherein the actuator is configured to drive a winding shaft of the screen.

19. A method of dimensioning a compensation spring for a range of blinds of different widths and heights, each blind incorporating the actuator according to claim 4, the method comprising:

selecting a range of n blinds to be equipped with compensation springs;

selecting a range of m spring rates of compensation springs;

determining a behavior of the n blinds for each spring rate in the range of m spring rates;

selecting a single spring rate from the range of m spring rates, depending on the determined behavior of the n blinds, which is suitable for the entire range of blinds.

20. The method according to claim 7, wherein the maximum electrical power delivered for each blind depends on a maximum torque to be provided in a fully unwound position of the blind and an electrical efficiency of the motor.

21. The electromechanical actuator of claim 1, further comprising a four-wire pair Ethernet cable, and wherein the power supply circuit comprises a data and power splitter circuit to which power and commands are supplied by the Ethernet network through the four-wire pair Ethernet cable, the data and power splitter circuit being configured to split the commands and power transmitted through the four-wire pair Ethernet cable, the data and power splitter circuit being configured to transmit the commands transmitted through the four-wire pair Ethernet cable to the controller circuit.

22. The electromechanical actuator of claim 1, wherein the connector is attached to an end of a cable exiting the electromechanical actuator and is a male RJ45 connector.

23. The electromechanical actuator of claim 1, wherein the connector is integrated in a torque support of the electromechanical actuator.

24. A communication network comprising:

the electromechanical actuator of claim 1;

and a network device connected to the wired Ethernet link and connected to the connector via a four-wire pair Ethernet cable, the motor being controlled by commands transmitted from the Ethernet network to the control board through the wired Ethernet link, through the network device and through the connector.

*   *   *   *   *